US012581261B2

(12) United States Patent
Kashina et al.

(10) Patent No.: US 12,581,261 B2
(45) Date of Patent: Mar. 17, 2026

(54) SOUND PROCESSING SYSTEM AND SOUND PROCESSING METHOD

(71) Applicant: Faurecia Clarion Electronics Co., Ltd., Saitama (JP)

(72) Inventors: Yuki Kashina, Saitama (JP); Chihiro Kuwayama, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 226 days.

(21) Appl. No.: 18/336,173

(22) Filed: Jun. 16, 2023

(65) Prior Publication Data

US 2023/0421982 A1 Dec. 28, 2023

(30) Foreign Application Priority Data

Jun. 23, 2022 (JP) ................................ 2022-100749

(51) Int. Cl.
*H04S 7/00* (2006.01)

(52) U.S. Cl.
CPC .......... *H04S 7/302* (2013.01); *H04R 2499/13* (2013.01); *H04S 2420/01* (2013.01)

(58) Field of Classification Search
CPC .. H04S 7/302; H04S 2420/01; H04R 2499/13
(Continued)

(56) References Cited

U.S. PATENT DOCUMENTS

2002/0044664 A1 4/2002 Fukuchi
2005/0004792 A1 1/2005 Ando et al.
(Continued)

FOREIGN PATENT DOCUMENTS

JP S63042000 U 3/1988
JP H06054399 A 2/1994
(Continued)

OTHER PUBLICATIONS

Office action issued by the Japanese Patent Office for application 2002-100749 on Jan. 15, 2026; Informal translation inlcuded.

*Primary Examiner* — Vivian C Chin
*Assistant Examiner* — Douglas J Suthers
(74) *Attorney, Agent, or Firm* — Reising Ethington P.C.

(57) ABSTRACT

A sound processing system includes: a function acquisition unit that acquires an interaural cross correlation function when listening to sound output from a plurality of speakers at a predetermined listening position; a position determination unit that determines a target position based on an interaural cross correlation function of a predetermined range of interaural cross correlation functions acquired by the function acquisition unit; a delay amount calculation unit that calculates a delay amount based on the target position determined by the position determination unit; and a delay unit that delays an audio signal, which is a signal of the sound, output to at least one of the plurality of speakers, based on the delay amount calculated by the delay amount calculation unit. The interaural cross correlation function of the predetermined range is an interaural cross correlation function in a range of ±n (where n is a positive value greater than 1) milliseconds.

6 Claims, 10 Drawing Sheets

(58) Field of Classification Search
USPC .......................................................... 381/302
See application file for complete search history.

(56) References Cited

U.S. PATENT DOCUMENTS

| | | | | |
|---|---|---|---|---|
| 2015/0086023 | A1* | 3/2015 | Enamito | H04S 7/302 381/17 |
| 2016/0205491 | A1* | 7/2016 | Sikora | H04R 3/12 381/302 |
| 2016/0345116 | A1* | 11/2016 | Yen | H04S 7/30 |
| 2017/0243597 | A1* | 8/2017 | Braasch | G10L 21/0264 |

FOREIGN PATENT DOCUMENTS

| | | | |
|---|---|---|---|
| JP | 2001314000 | A | 11/2001 |
| JP | 2003177777 | A | 6/2003 |
| JP | 2008067087 | A | 3/2008 |
| JP | 2015065541 | A | 4/2015 |

* cited by examiner

SOUND PROCESSING SYSTEM AND SOUND PROCESSING METHOD

TECHNICAL FIELD

The present invention relates to a sound processing system and a sound processing method.

BACKGROUND

In general, speakers are installed at a plurality of positions in a vehicle interior. For example, a right front speaker in a right door part and a left front speaker in a left door part are installed at symmetrical positions with respect to a center line of a vehicle interior space. However, these speakers are not in symmetrical positions with respect to a listening position of a listener (driver seat, front passenger seat, rear seat, and the like).

For example, if a listener is sitting in the driver seat, the distance between the right front speaker and the listener is not equal to the distance between the left front speaker and the listener. As an example, for a right-hand drive car, the former distance is shorter than the latter distance. Therefore, when sound is output from speakers of two door parts at the same time, the listener sitting in the driver seat generally hears the sound output from the right front speaker, followed by the sound output from the left front speaker. The difference in distance between the listening position of the listener and each of the plurality of speakers (difference in time for a reproduced sound emitted from each speaker to arrive) causes a bias in sound image localization due to the Haas effect.

Various technologies are known to improve such sound image localization bias (for example, see Patent Document 1—Japanese Unexamined Patent Application 2008-67087).

SUMMARY

However, the conventional technology exemplified in Patent Document 1 may not sufficiently improve sound image localization bias.

Therefore, in view of the foregoing, an object of the present application is to provide a sound processing system and sound processing method suitable for improving sound image localization bias.

A sound processing system according to an embodiment of the present application includes: a function acquisition unit that acquires an interaural cross correlation function when listening to sound output from a plurality of speakers at a predetermined listening position; a position determination unit that determines a target position based on an interaural cross correlation function of a predetermined range of interaural cross correlation functions acquired by the function acquisition unit; a delay amount calculation unit that calculates a delay amount based on the target position determined by the position determination unit; and a delay unit that delays an audio signal, which is a signal of the sound, output to at least one of the plurality of speakers, based on the delay amount calculated by the delay amount calculation unit. The interaural cross correlation function of the predetermined range is an interaural cross correlation function in a range of ±n (where n is a positive value greater than 1) milliseconds.

According to one embodiment of the present application, a sound processing system and sound processing method suitable for improving sound image localization bias are provided.

DETAILED DESCRIPTION OF EMBODIMENTS

The following description relates to a sound processing system and sound processing method according to an embodiment of the present application.

Figure 1:
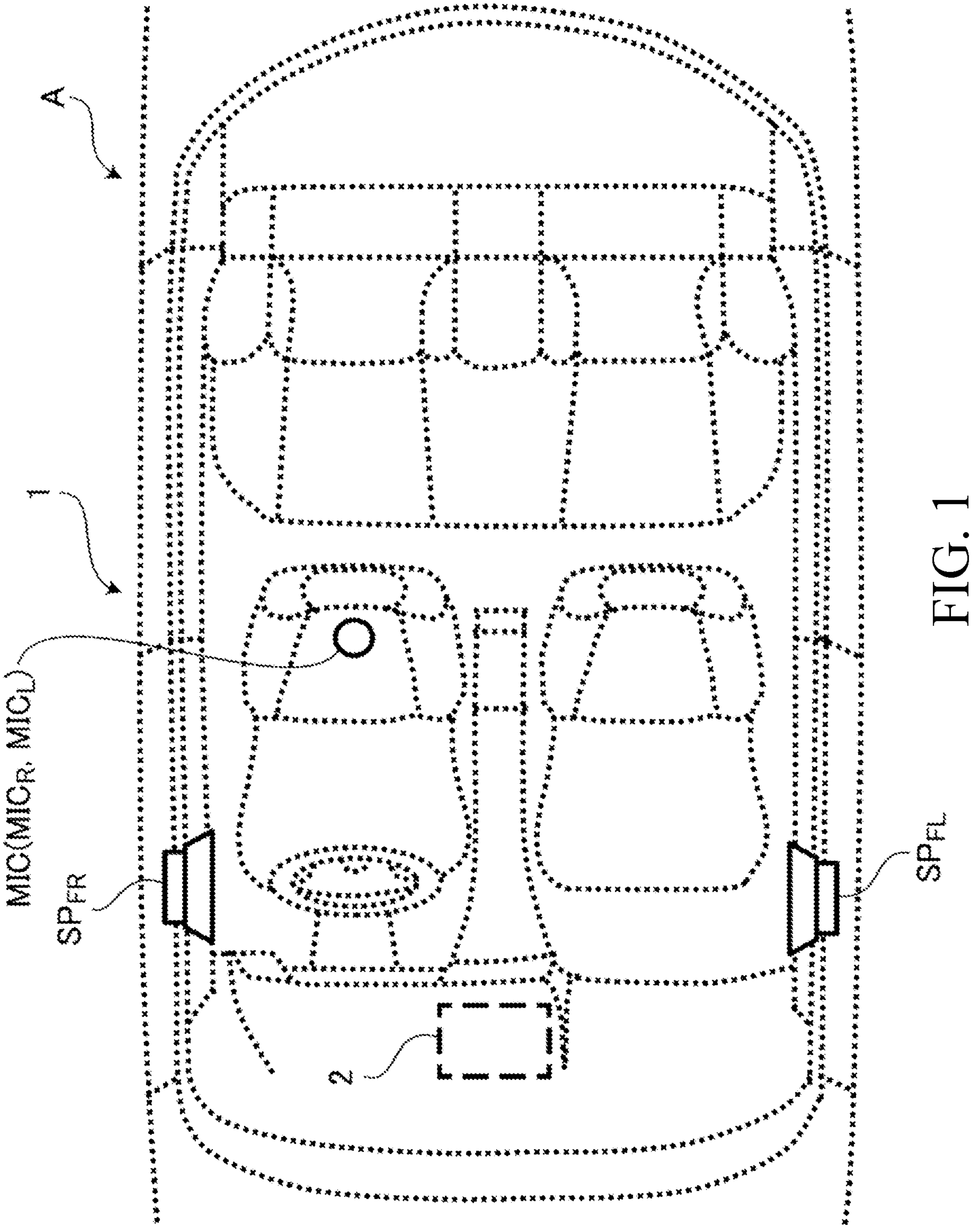
FIG. 1 is a diagram schematically showing a vehicle in which the sound processing system according to an embodiment of the present application is installed.

FIG. 1 is a diagram schematically showing a vehicle A (using a right-hand drive car as an example) in which a sound processing system 1 according to an embodiment of the present application is installed. As shown in FIG. 1, the sound processing system 1 is provided with a sound processing device 2, a pair of left and right speakers $SP_{FR}$ and $SP_{FL}$, and a binaural microphone MIC.

The speaker $SP_{FR}$ is a right front speaker embedded in a right door part (driver seat side door part). The speaker $SP_{FL}$ is a left front speaker embedded in a left door part (front passenger seat side door part). The vehicle A may have yet another speaker (e.g., rear speaker) installed (i.e., three or more speakers).

The binaural microphone MIC has, for example, a configuration in which a microphone is incorporated in each ear of a dummy head imitating a human head. Hereinafter, the microphone incorporated in the right ear of the dummy head will be referred to as "microphone $MIC_R$." The microphone incorporated in the left ear of the dummy head will be referred to as "microphone MICS."

Figure 2:
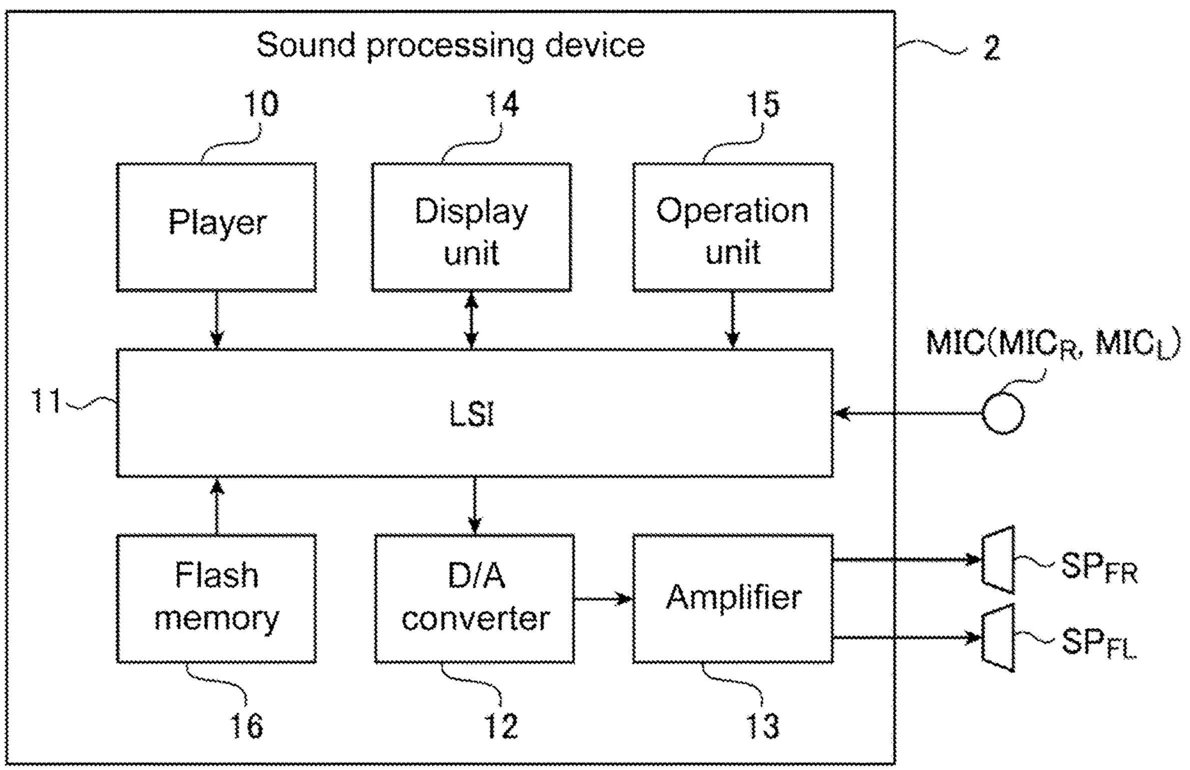
FIG. 2 is a block diagram showing a hardware configuration of a sound processing device according to an embodiment of the present application.

FIG. 2 is a block diagram showing a hardware configuration of the sound processing device 2. As shown in FIG. 2, the sound processing device 2 is provided with a player 10, LSI (Large Scale Integration) 11, D/A converter 12, amplifier 13, display unit 14, operation unit 15, and flash memory 16.

The player 10 is connected to a sound source. The player 10 plays an audio signal input from the sound source, which is then output to the LSI 11.

Examples of the sound source include disc media such as CDs (Compact Disc), SACDs (Super Audio CD), and the like that store digital audio data and storage media such as HDDs (Hard Disk Drive), USBs (Universal Serial Bus), and the like. A telephone (e.g., feature phone, smartphone) may be the sound source. In this case, the player 10 outputs through to the LSI 11 the voice signal during a call input from the telephone.

The LSI 11 is an example of a computer provided with a CPU (Central Processing Unit), RAM (Random Access Memory), ROM (Read Only Memory), and the like. The CPU of the LSI 11 includes a single processor or a multi-processor (in other words, at least one processor) that executes a program written in the ROM of the LSI 11 and comprehensively controls the sound processing device 2.

The LSI 11 acquires an interaural cross correlation function (IACF) when listening to sound output from a plurality of speakers (in the present embodiment, speakers $SP_{FR}$ and $SP_{FL}$) at a predetermined listening position (e.g., driver seat, front passenger seat, or rear seat), determines a target position based on an interaural cross correlation function of a predetermined range of acquired interaural cross correlation functions, calculates a delay amount based on the determined target position, and delays an audio signal, which is a signal of the sound, output to at least one of the plurality of speakers, based on the calculated delay amount. The interaural cross correlation function of the predetermined range is an interaural cross correlation function in a range of ±n (where n is a positive value greater than 1) milliseconds (msec).

The audio signal after the time alignment processing by LSI 11 is converted to an analog signal by the D/A converter 12. The analog signal is amplified by the amplifier 13 and output to the speakers $SP_{FR}$ and $SP_{FL}$. As a result, music recorded in the sound source, for example, is reproduced in the vehicle interior from the speakers $SP_{FR}$ and $SP_{FL}$.

According to the present embodiment, the delay amount is calculated using the interaural cross correlation function over a wide range exceeding the ±1 millisecond range (i.e., ±n millisecond range) and time alignment processing is performed to improve the bias in sound image localization that tends to occur in a listening environment of a vehicle interior.

In the present embodiment, a vehicle-mounted sound processing system 1 is exemplified. However, sound image localization bias can also occur in listening environments such as rooms in a building and the like. Therefore, the sound processing system 1 may be implemented for listening environments other than a vehicle interior.

The display unit 14 is a device that displays various screens, such as a settings screen, and examples include LCDs (Liquid Crystal Display), ELs (Electro Luminescence), and other displays. The display unit 14 may be configured to include a touch panel.

The operation unit 15 includes operators such as switches, buttons, knobs, wheels, and the like of a mechanical system, a capacitance non-contact system, a membrane system, and the like. If the display unit 14 includes a touch panel, the touch panel also forms a portion of the operation unit 15.

Figure 3:
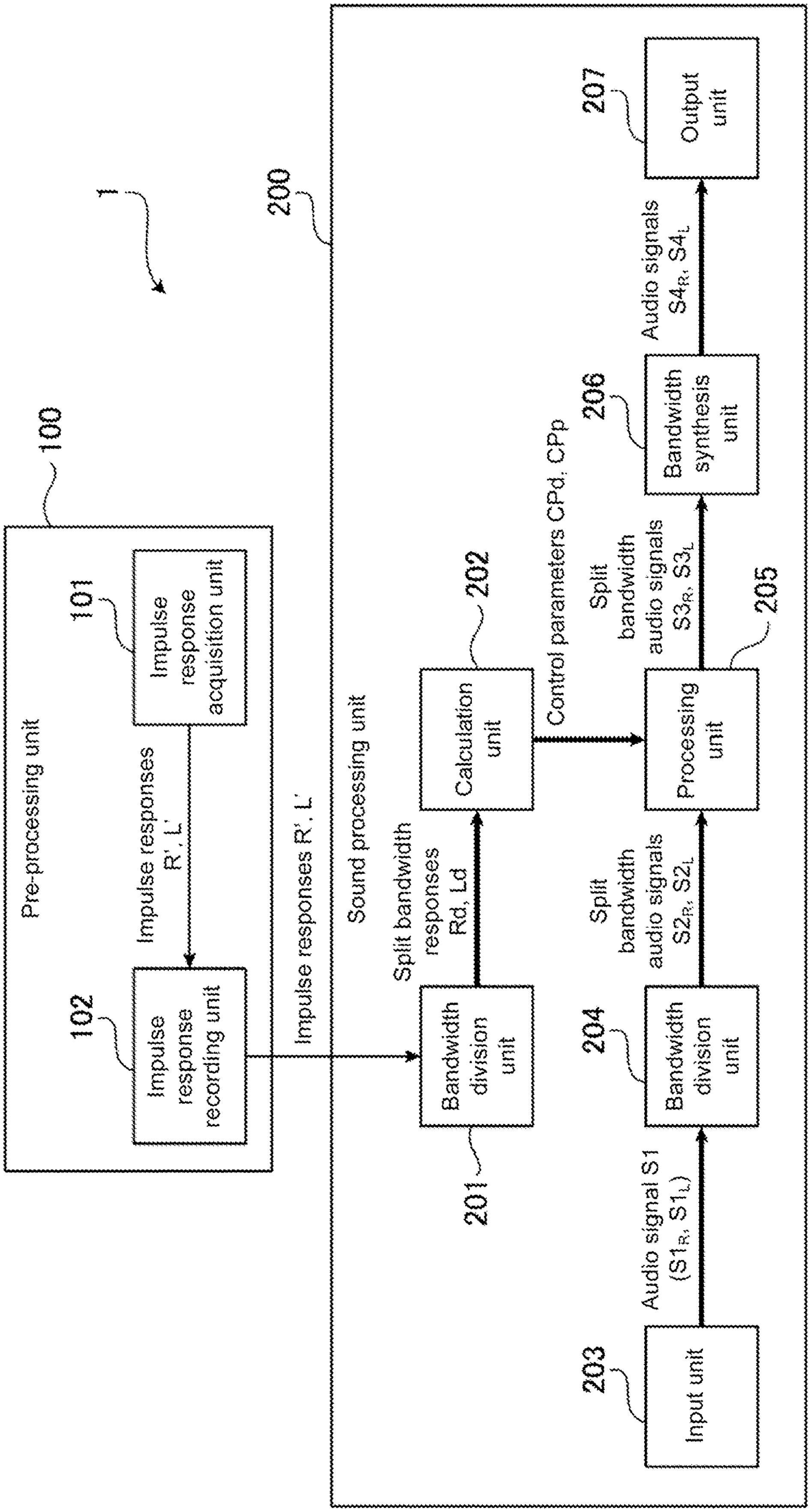
FIG. 3 is a functional block diagram of the sound processing system according to an embodiment of the present application.

FIG. 3 is a functional block diagram of the sound processing system 1. The functions shown in each block are performed by cooperation of software and hardware provided in the sound processing system 1.

As shown in FIG. 3, the sound processing system 1 includes a pre-processing unit 100 and a sound processing unit 200 as functional blocks.

The pre-processing unit 100 performs pre-processing to improve sound image localization bias. As shown in FIG. 3, the pre-processing unit 100 includes an impulse response acquisition unit 101 and an impulse response recording unit 102.

Figure 4:
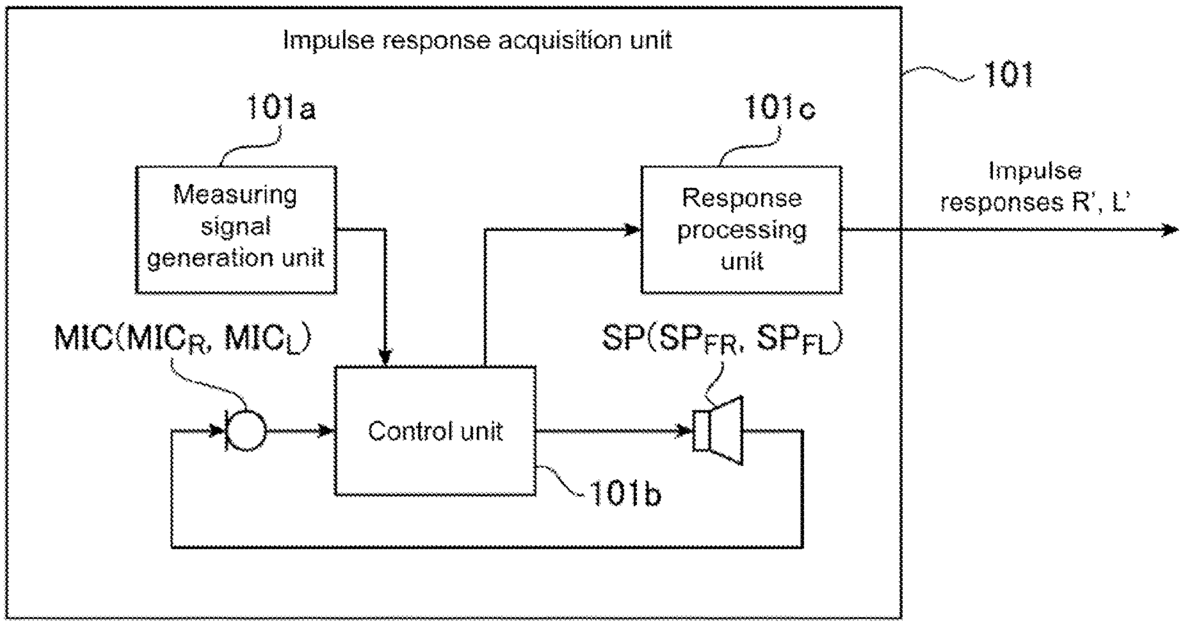
FIG. 4 is a functional block diagram showing an impulse response acquisition unit according to an embodiment of the present application.

FIG. 4 is a functional block diagram showing the impulse response acquisition unit 101. As shown in FIG. 4, the impulse response acquisition unit 101 includes a measuring signal generation unit 101*a*, control unit 101*b*, and response processing unit 101*c* as functional blocks.

The measuring signal generation unit 101*a* generates a predetermined measuring signal. The generated measuring signal is, for example, an M-sequence code (Maximal length sequence). The length of the measuring signal is at least twice the code length. Note that the measuring signal may be another type of signal, such as a TSP signal (Time Stretched Pulse) or the like, for example.

The control unit 101*b* sequentially outputs the measuring signal input from the measuring signal generation unit 101*a* to each of the speakers $SP_{FR}$ and $SP_{FL}$. As a result, predetermined measuring sounds are sequentially output from each of the speakers $SP_{FR}$ and $SP_{FL}$ at a predetermined time interval.

In the present embodiment, the measurement position of the impulse response (an example of a predetermined listening position) is the driver seat. Therefore, the binaural microphone MIC is installed in the driver seat. The installation position of the binaural microphone MIC changes based on the listening position.

The microphone $MIC_R$ and microphone $MIC_L$ first acquire the measuring sound output from the speaker $SP_{FR}$. The microphone $MIC_R$ and microphone $MIC_L$ then acquire the measuring sound output from the speaker $SP_{FL}$.

The control unit 101*b* outputs signals of the measuring sounds (i.e., measurement signals) acquired by each of the microphones $MIC_R$ and $MIC_L$ to the response processing unit 101*c*. Hereinafter, the measurement signal output from the speaker $SP_{FR}$ and acquired by the microphone $MIC_R$ will be referred to as "measurement signal $R_R$." The measurement signal output from the speaker $SP_{FL}$ and acquired by the microphone $MIC_R$ will be referred to as "measurement signal $R_L$." The measurement signal output from the speaker $SP_{FR}$ and acquired by the microphone $MIC_L$ will be referred to as "measurement signal $L_R$." The measurement signal output from the speaker $SP_{FL}$ and acquired by the microphone $MIC_L$ will be referred to as "measurement signal $L_L$."

The response processing unit 101*c* acquires an impulse response.

By way of example, the response processing unit 101*c* calculates an impulse response by determining a cross correlation function between the measurement signal $R_R$ and a reference measurement signal by mathematical operation, calculates an impulse response by determining a cross correlation function between the measurement signal $R_L$ and the reference measurement signal by mathematical operation, and synthesizes the two calculated impulse responses. The synthesized impulse response is an impulse response corresponding to the right ear of a listener. Hereinafter, the impulse response corresponding to the right ear of the listener will be referred to as "impulse response R'."

The response processing unit 101*c* calculates an impulse response by determining a cross correlation function between the measurement signal $L_R$ and a reference measurement signal by mathematical operation, calculates an impulse response by determining a cross correlation function between the measurement signal $L_L$ and the reference measurement signal by mathematical operation, and synthesizes the two calculated impulse responses. The synthesized impulse response is an impulse response corresponding to the left ear of the listener. Hereinafter, the impulse response corresponding to the left ear of the listener will be referred to as "impulse response L'."

Note that the reference measurement signal is the same as the measuring signal generated by the measuring signal generation unit 101*a* and, is time synchronized. The reference measurement signal is stored in the flash memory 16, for example.

The impulse response recording unit 102 writes the impulse responses R' and L' acquired by the impulse response acquisition unit 101 to, for example, the flash memory 16.

As shown in FIG. 3, the sound processing unit 200 includes a bandwidth division unit 201, a calculation unit 202, an input unit 203, a bandwidth division unit 204, a processing unit 205, a bandwidth synthesis unit 206, and an output unit 207.

The bandwidth division unit 201 includes, for example, a 1/N octave bandwidth filter. The bandwidth division unit 201 divides each of the impulse responses R' and L' written to the flash memory 16 into a plurality of bandwidths bw1 to bwN with the 1/N octave bandwidth filter, which are then output to the calculation unit 202.

Hereinafter, the impulse response R' of each bandwidth after division will be referred to as "split bandwidth response Rd". Furthermore, the impulse response L' of each bandwidth after division will be referred to as "split bandwidth response Ld".

The calculation unit 202 generates various control parameters by performing the following processes for each of the bandwidths bw1 to bwN: calculation of the interaural cross correlation function based on the split bandwidth response Rd and split bandwidth response Ld; determination of the target position based on the calculated interaural cross correlation function; calculation of the delay amount based on the target position; and calculation of the phase correction amount. Details of each process by the calculation unit 202 are described later.

Note that the various control parameters generated by the calculation unit 202 include control parameters CPd and CPp corresponding to each of the bandwidths bw1 to bwN. The control parameter CPd is a control parameter for delaying one of either the audio signal output to the speaker $SP_{FR}$ or audio signal output to the speaker $SP_{FL}$. The control parameter CPp is a control parameter for determining the phase correction amount of the audio signal by an all-pass filter.

The input unit 203 includes a selector connected to various sound sources. The input unit 203 outputs an audio signal S1 input from the sound source connected to the selector to the bandwidth division unit 204.

Note that in the present embodiment, the audio signal S1 is a two-channel signal that includes an R-channel audio signal $S1_R$ and an L-channel audio signal $S1_L$.

The bandwidth division unit 204 includes, for example, a 1/N octave bandwidth filter. The bandwidth division unit 204 divides the audio signal S1 input from the input unit 203 into a plurality of bandwidths bw1 to bwN using the 1/N octave band filter, similar to the bandwidth division unit 201, which are then output to the processing unit 205.

Hereinafter, the audio signal $S1_R$ in each bandwidth after division will be referred to as "split bandwidth audio signal $S2_R$." Furthermore, the audio signal $S1_L$ in each bandwidth after division will be referred to as "split bandwidth audio signal $S2_L$."

Figure 5:
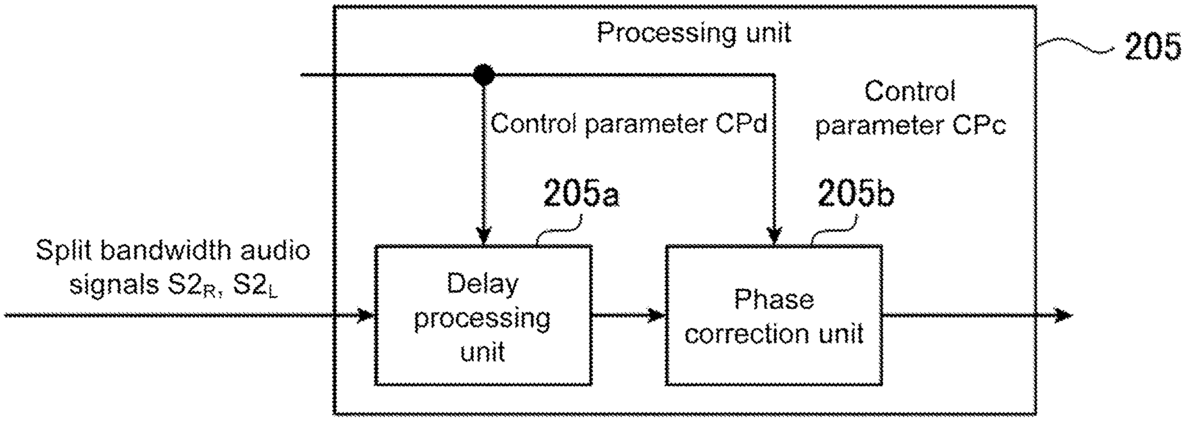
FIG. 5 is a functional block diagram showing a processing unit according to an embodiment of the present application.

FIG. 5 is a functional block diagram showing the processing unit 205. As shown in FIG. 5, the processing unit 205 includes a delay processing unit 205*a* and a phase correction unit 205*b*.

The delay processing unit 205A delays audio signals for each of the bandwidths bw1 to bwN. By way of example, for each of the bandwidths bw1 to bwN, the delay processing unit 205*a* delays one of the split bandwidth audio signal $S2_R$ or split bandwidth audio signal $S2_L$ input from the bandwidth division unit 204 based on the control parameter CPd input from the calculation unit 202, and then outputs the signal to the phase correction unit 205*b*.

The phase correction unit 205*b* corrects the phase of the audio signal for each of the bandwidths bw1 to bwN. By way of example, the phase correction unit 205*b* includes an all-pass filter. As described in detail later, if the sign of the correlation value of the interaural cross correlation function is negative, the phase correction unit 205*b* applies the all-pass filter to the split bandwidth audio signals $S2_R$ and $S2_L$ to correct the phase based on the control parameter CPp input from the calculation unit 202, and then outputs the signals to the bandwidth synthesis unit 206. Furthermore, if the sign of the correlation value of the interaural cross correlation function is positive, the phase correction unit 205*b* outputs to the bandwidth synthesis unit 206 without applying the all-pass filter to the split bandwidth audio signals $S2_R$ and $S2_L$.

Hereinafter, the split bandwidth audio signal $S2_R$ output from the phase correction unit 205*b* will be referred to as "split bandwidth audio signal $S3_R$." Furthermore, the split bandwidth audio signal $S3_L$ output from the phase correction unit 205*b* will be referred to as "split bandwidth audio signal $S3_L$."

The bandwidth synthesis unit 206 synthesizes the split bandwidth audio signal $S3_R$ in the bandwidths bw1 to bwN input from the phase correction unit 205*b* and the split bandwidth audio signal $S3_L$ in the bandwidths bw1 to bwN input from the phase correction unit 205*b*. An R-channel audio signal $S4_R$ obtained by synthesizing the split bandwidth audio signal $S3_R$ of the bandwidths bw1 to bwN and the L-channel audio signal $S4_L$ obtained by synthesizing the split bandwidth audio signal $S3_L$ of the bandwidths bw1 to bwN are output to the output unit 207.

The output unit 207 converts the two-channel audio signals $S4_R$ and $S4_L$ input from the bandwidth synthesis unit 206 into analog signals, respectively, amplifies the converted analog signals, and then outputs from the speakers $SP_{FR}$ and $SP_{FL}$ inside the vehicle interior. As a result, music of the sound source is reproduced, for example. Time alignment processing is performed based on the control parameter CPd in the delay processing unit 205*a*, such that sound image localization bias during music playback is improved.

Figure 6:
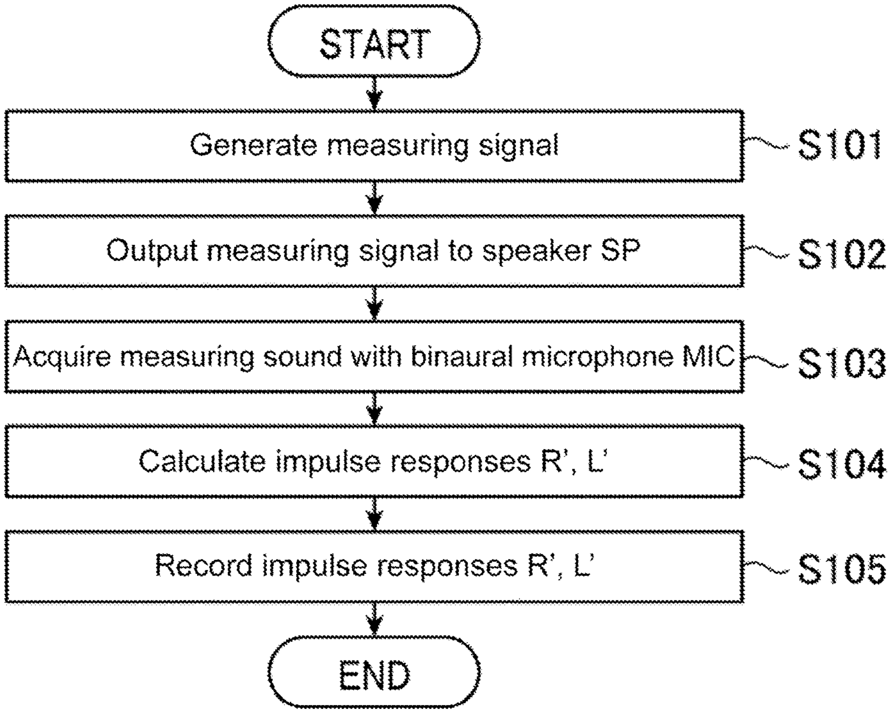
FIG. 6 is a flowchart showing pre-processing performed by a pre-processing unit according to an embodiment of the present application.

FIG. 6 is a flowchart showing pre-processing performed by the pre-processing unit 100 according to an embodiment of the present application. For example, when a predetermined touch operation on the display unit 14 or a predetermined operation on the operation unit 15 is performed, execution of the pre-processing shown in FIG. 6 is started. Note that when performing the pre-processing, the binaural microphone MIC is installed at the listening position (e.g., driver seat).

In the pre-processing shown in FIG. 6, the measuring signal generation unit 101*a* generates a predetermined measuring signal (step S101). The control unit 101*b* sequentially outputs the measuring signal to each of the speakers $SP_{FR}$ and $SP_{FL}$ (step S102).

The binaural microphone MIC acquires the measurement sound sequentially output from each of the speakers $SP_{FR}$ and $SP_{FL}$ (step S103).

The control unit 101*b* outputs the measurement signals (specifically, the measurement signals $R_R$, $R_L$, $L_R$ and $L_L$) input from the binaural microphone MIC to the response processing unit 101*c*.

The response processing unit 101*c* calculates the impulse response R' based on the measurement signals $R_R$ and $R_L$ input from the control unit 101*b* and the impulse response L' based on the measurement signals $L_R$ and $L_L$ input from the control unit 101*b* (step S104). The impulse response recording unit 102 writes the impulse responses R' and L' calculated by the response processing unit 101*c* to the flash memory 16 (step S105).

Figure 7:
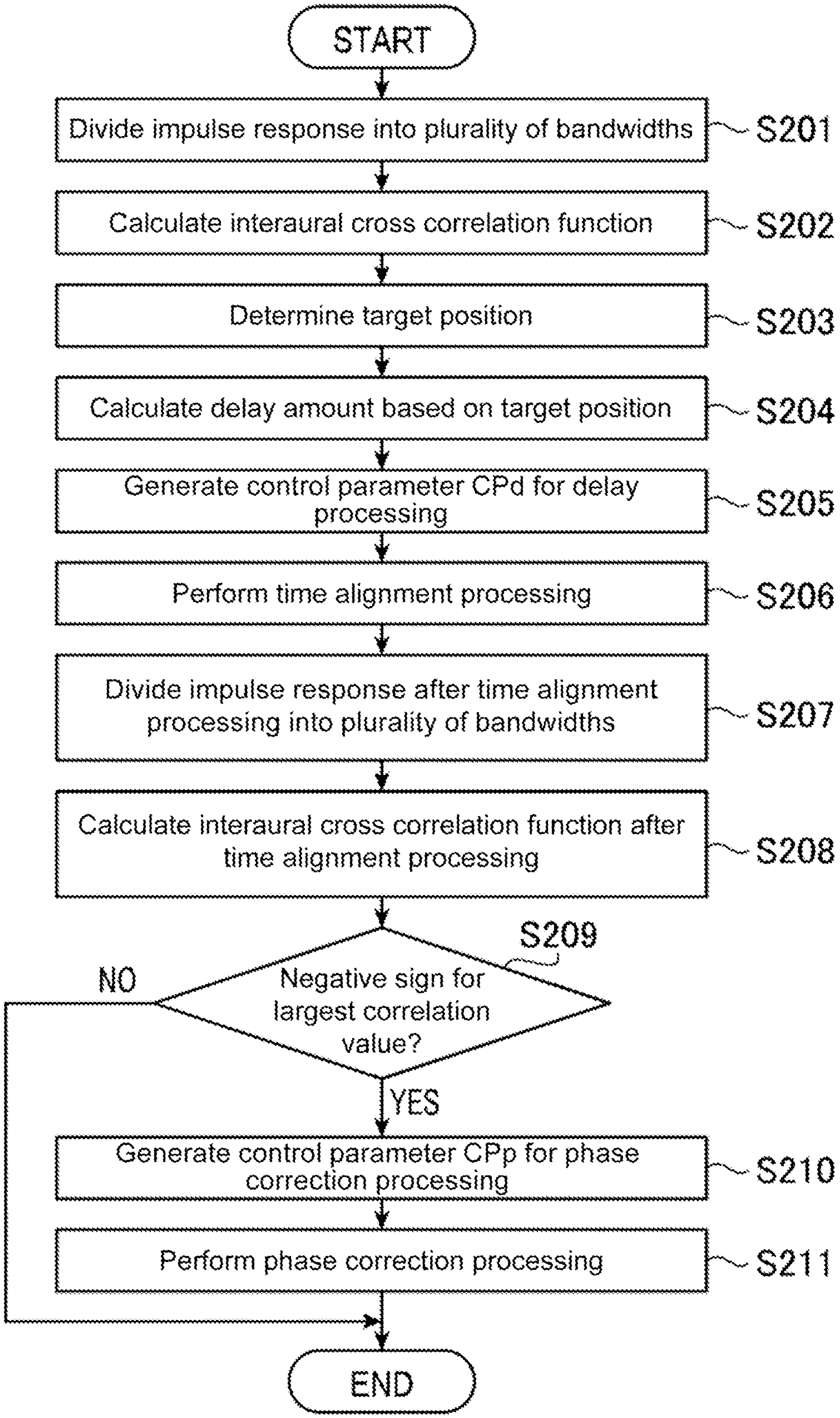
FIG. 7 is a flowchart showing sound processing performed by a sound processing unit according to an embodiment of the present application.

FIG. 7 is a flowchart showing sound processing performed by the sound processing unit 200 according to an embodiment of the present application. For example, once the impulse responses R' and L' are written to the flash memory 16 by the impulse response recording unit 102, execution of acoustic processing shown in FIG. 7 is started.

In the acoustic processing shown in FIG. 7, the bandwidth division unit 201 divides each of the impulse responses R' and L' written to the flash memory 16 into a plurality of bandwidths bw1 to bwN (step S201). The split bandwidth responses Rd and Ld for each bandwidth after division are input to the calculation unit 202.

Figure 8:
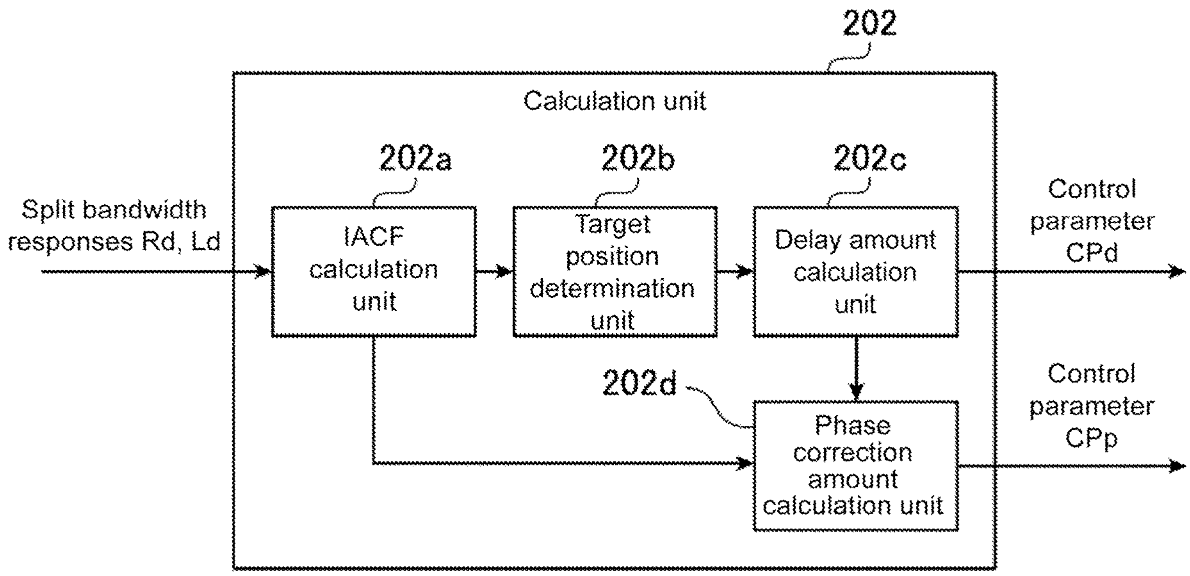
FIG. 8 is a functional block diagram showing a calculation unit according to an embodiment of the present application.

FIG. 8 is a functional block diagram showing the calculation unit 202. As shown in FIG. 8, the calculation unit 202 includes an IACF calculation unit 202*a*, a target position determination unit 202*b*, a delay amount calculation unit 202*c*, and a phase correction amount calculation unit 202*d*.

The IACF calculation unit 202*a* calculates the interaural cross correlation function for each of the bandwidths bw1 to bwN (step S202). By way of example, the IACF calculation unit 202*a* calculates the interaural cross correlation function in accordance with the following equation.

$$IACF(\tau) = \frac{\int_{t1}^{t2} Rd(t)\cdot Ld(t+\tau)dt}{\sqrt{\int_{t1}^{t2} Rd^2(t)dt \cdot \int_{t1}^{t2} Ld^2(t)dt}} \quad \text{(Equation)}$$

Rd(t) represents the amplitude of the split bandwidth response Rd at time t and represents the sound pressure entering the right ear at time t. Ld(t) represents the amplitude of the split bandwidth response Ld in the same bandwidth as the split bandwidth response Rd at the time t and represents the sound pressure entering the left ear at time t. t1 and t2 represent measurement times. As an example, t1 is 0 milliseconds and t2 is 100 milliseconds. T represents a correlation time. The range of the correlation time T is greater than ±1 millisecond and, for example, is in a range of ±50 milliseconds.

Figure 9:
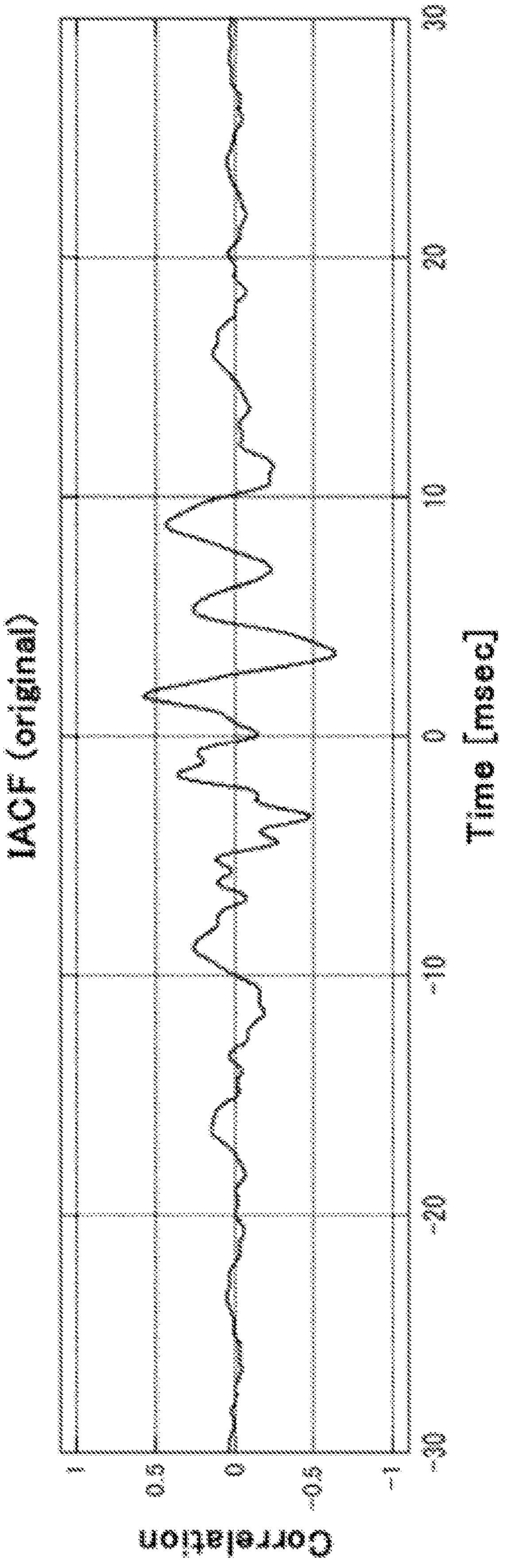
FIG. 9 is a diagram showing an example of an interaural cross correlation function calculated by an IACF calculation unit according to an embodiment of the present application.

FIG. 9 is a diagram showing the interaural cross correlation function calculated by the IACF calculation unit 202*a*. FIG. 9 shows, as an example, the interaural cross correlation function in one of the bandwidths bw1 to bwN. In FIG. 9, the vertical axis indicates the correlation value and the horizontal axis indicates the correlation time (unit: msec).

The closer the waveforms of the sound reaching the right and left ears of the listener, the closer the absolute value of the correlation value approaches 1 in the interaural cross correlation function exemplified in FIG. 9. If the sound reaching the right and left ears of the listener is in the same phase, the correlation value is positive; if the sound reaching the right and left ears of the listener is in the opposite phase, the correlation value is negative. The higher the absolute value of the correlation value, the stronger the sense of sound image localization, and the lower the absolute value of the correlation value, the weaker the sense of sound image localization.

In the present embodiment, the correlation value is calculated based on the right ear. Therefore, if the sound image is present on the right side of the listener, a higher peak correlation value is more likely to appear at a positive time. Furthermore, if the sound image is present on the left side of the listener, a higher peak correlation value is more likely to appear at a negative time. In light thereof, it is presumed that the sound image is localized slightly to the right of the listener in the example in FIG. 9.

Thus, the IACF calculation unit 202*a* operates as a function acquisition unit that acquires the interaural cross-correlation when listening to sound output from a plurality of speakers (speakers $SP_{FR}$ and $SP_{FL}$) at a predetermined listening position (e.g., driver seat, front passenger seat, or rear seat).

In the present embodiment, the following processing is performed to improve the slightly right-biased sound image localization shown in FIG. 9.

By way of example, the target position determination unit 202*b* determines the target position based on the interaural cross correlation function calculated in step S202 for each of the bandwidths bw1 to bwN (step S203).

Figure 10:
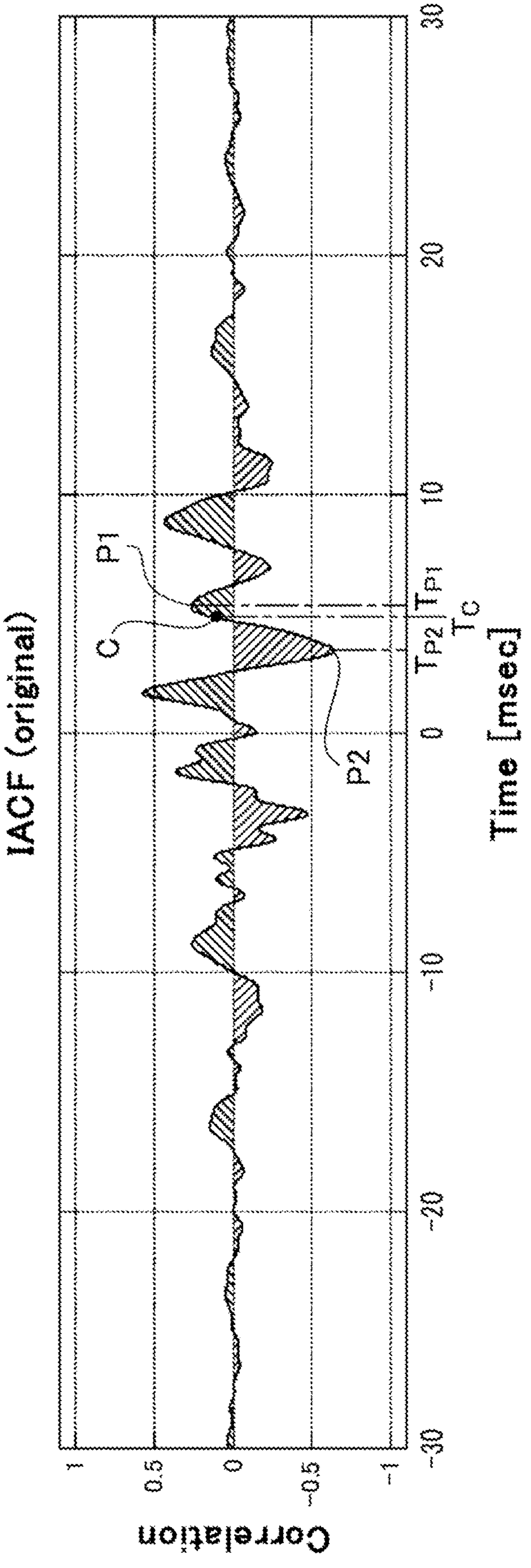
FIG. 10 is a diagram for describing a method of determining a target position according to an embodiment of the present application.

FIG. 10 is a diagram in which codes and the like for describing the target position determination method are added to FIG. 9. The target position determination unit 202*b* calculates the acoustic center C of the interaural cross correlation function of the predetermined range, on a coordinate plane with a correlation value on the vertical axis and time on the horizontal axis, as shown in FIG. 9.

The interaural cross correlation function of the predetermined range is an interaural cross correlation function in a range of ±30 milliseconds, for example. The acoustic center C is the center of the entire shape formed by the interaural cross correlation function in the ±30 milliseconds range on the coordinate plane. The shape formed by the binaural cross-correlation function is the shape indicated by the hatched region (see FIG. 10) surrounded by the line of correlation value 0 and the graph of the interaural cross correlation function.

The target position determination unit 202*b* determines the calculated acoustic center C as the target position.

In another embodiment, the target position determination unit 202*b* may determine the peak position of the interaural cross correlation function near the acoustic center C as the target position. By way of example, the target position determination unit 202*b* may determine the peak position P1 nearest to the acoustic center C as the target position, or the largest peak position P2 within a certain range (e.g., ±10 milliseconds centered on the acoustic center C) as the target position.

Thus, the target position determination unit 202*b* operates as a position determination unit that determines the target position based on the interaural cross correlation function in a predetermined range (±n millisecond range) of the interaural cross correlation functions acquired by the IACF calculation unit 202*a*. In other words, the target position determination unit 202*b* operates as an acoustic center calculation unit that calculates the acoustic center C of the interaural cross correlation function in a predetermined range on a coordinate plane with the correlation value on the vertical axis and time on the horizontal axis, and determines the target position based on the acoustic center.

The delay amount calculation unit 202*c* calculates the delay amount based on the target position determined by the target position determination unit 202*b* for each of the bandwidths bw1 to bwN (step S204).

By way of example, the delay amount calculation unit 202*c* calculates the delay amount for the audio signal output to one speaker SP such that the acoustic center C, which is the target position, is positioned at or near 0 seconds on the time axis. In the present embodiment, the acoustic center C appears at a position on the time axis that is time $T_C$ seconds (in other words, slightly to the right of the listener). Therefore, the delay amount calculation unit 202*c* calculates time $T_C$ seconds as the delay amount for the audio signal output to the speaker $SP_{FR}$.

The delay amount calculation unit 202*c* generates a control parameter CPd for delaying a delay target audio signal for each of the bandwidths bw1 to bwN (step S205).

The control parameter CPd includes a value indicating the delay target and a delay amount thereof. In the examples of FIGS. 9 and 10, the control parameter CPd includes a value indicating the audio signal output to the speaker $SP_{FR}$ as the delay target and a value indicating the time $T_C$ seconds as the delay amount.

Note that when the target position is the peak position P1, the delay amount calculation unit 202*c* calculates the time $T_{P1}$ seconds as the delay amount for the audio signal output to the speaker $SP_{FR}$. When the target position is the peak position P2, the delay amount calculation unit 202*c* calculates the time $T_{P2}$ seconds as the delay amount for the audio signal output to the speaker $SP_{FR}$.

The sound processing unit 200 performs time alignment processing based on the control parameter CPd (step S206).

Specifically, the delay processing unit 205*a* of processing unit 205 performs delay processing based on the control parameter CPd for each of the bandwidths bw1 to bwN. Next, bandwidth synthesis processing by the bandwidth synthesis unit 206 and output processing by the output unit 207 are performed to reproduce an audio signal in which time alignment processing is applied to each of the bandwidths bw1 to bwN.

Thus, the delay processing unit 205*a* operates as a delay unit that delays the audio signal output to at least one of the plurality of speakers based on the delay amount calculated by the delay amount calculation unit 202*c*.

In the pre-processing unit 100, the impulse responses R' and L' of the sound after time alignment processing output from the output unit 207 are calculated and written to the flash memory 16 (see steps S103 to S106 in FIG. 6).

The bandwidth division unit 201 divides each of the impulse responses R' and L' of the sound after time alignment processing, written to the flash memory 16, into a plurality of bandwidths bw1 to bwN (step S207). The IACF calculation unit 202*a* calculates the interaural cross correlation function of the impulse responses R' and L' of the sound after time alignment processing for each of the bandwidths bw1 to bwN (step S208).

Figure 11:
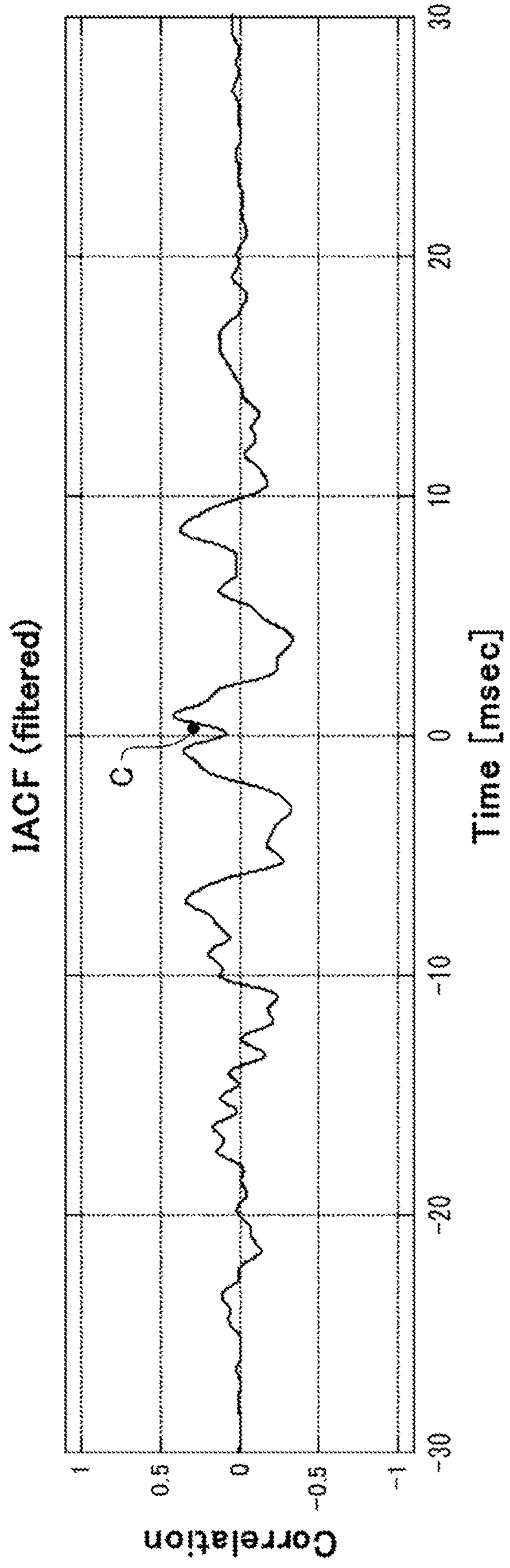
FIG. 11 is a diagram showing an example of an interaural cross correlation function calculated by the IACF calculation unit after time alignment processing.

FIG. 11 is a diagram showing an example of the interaural cross correlation function calculated by the IACF calculation unit 202*a* in step S208.

As shown in FIG. 11, the acoustic center C of the interaural cross correlation function in the predetermined range (±30 milliseconds range) has moved to a position near 0 seconds on the time axis as a result of performing the time alignment processing based on the control parameter CPd. In the example shown in FIG. 11, the acoustic center C, where the sound image has a sense of sound image localization, is positioned near 0 seconds on the time axis, indicating that the bias of sound image localization is improved.

In the present embodiment, the target position is not determined by a simple method, for example, by determining the highest peak position as the target position, but is determined based on the acoustic center, in which correlation values other than the peak position are also considered (in other words, values that affect the sense of sound image localization). Therefore, even in a listening environment such as a vehicle interior and the like, where the graph of the interaural cross correlation function can take a complicated shape due to asymmetric speaker placement and a large amount of reflected and reverberant sound, an effect of improving the sound image localization bias can be sufficiently achieved.

Herein, if the sign of the correlation value with the largest absolute value of the interaural cross correlation functions in the predetermined range calculated in step S208 is negative, the phase of the sound from the speaker $SP_{FR}$ and the sound from the speaker $SP_{FL}$ is inverted at a position where the sense of sound image localization is strong. This causes the listener to feel auditory discomfort.

Therefore, if the sign of the largest correlation value above is negative (step S209: YES), the phase correction amount calculation unit 202*d* generates a control parameter CPp to make the sign of the correlation value positive (step S210). If the sign of the largest correlation value above is positive (step S209: NO), the acoustic processing shown in FIG. 7 ends.

The control parameter CPp includes a value indicating the phase correction amount. The phase correction amount indicates, for example, a value for turning the phase of a processing target bandwidth by 180° of the bandwidths bw1 to bwN.

The sound processing unit 200 performs phase correction processing based on the control parameter CPp (step S211).

Specifically, the phase correction unit 205*b* of the processing unit 205 performs phase correction processing based on the control parameter CPp by an all-pass filter for each of the bandwidths bw1 to bwN. The all-pass filter applied in the phase correction processing is, for example, a cascade connection of a predetermined number of second-order IIR (Infinite Impulse Response) filters. Note that the number of second-order IIR filters is determined as appropriate, taking into account the accuracy of phase correction and a filter processing load.

The phase correction processing by the phase correction unit 205*b* aligns the phase of the sound from the speaker $SP_{FR}$ and the sound from the speaker $SP_{FL}$, such that music and the like are reproduced as an audibly natural sound.

The aforementioned is a description of exemplary embodiments. Embodiments of the present invention are not limited to those described above, and various modifications are possible within a scope of the technical concept of the present invention. For example, embodiments and the like that are explicitly indicated by way of example in the specification or combinations of obvious embodiments and the like are also included, as appropriate, in the embodiments of the present application.

For example, in the embodiment above, calculation and recording of the impulse responses R' and L' are performed as pre-processing to improve sound image localization bias, but the present invention is not limited thereto. In another embodiment, in addition to the calculation and recording of the impulse responses R' and L', bandwidth division by the bandwidth division unit 201 and various processes by the calculation unit 202 (calculation of interaural cross correlation function, determination of target position, calculation of delay amount, calculation of phase correction amount, and control parameters) may be performed as pre-processing.

If a pair of speakers is installed on the rear seat side in addition to the speakers $SP_{FR}$ and $SP_{FL}$, processing is performed by the following procedure. By way of example, a binaural microphone MIC is installed in a front seat (driver seat or front passenger seat), and the processing shown in FIGS. 6 and 7 is performed for the speakers $SP_{FR}$ and $SP_{FL}$. Next, a binaural microphone MIC is installed in the rear seat, and the processing shown in FIGS. 6 and 7 is performed for the pair of speakers on the rear seat side.

REFERENCE NUMERALS USED IN THE DRAWINGS

1: Sound processing system
2: Sound processing device
100: Pre-processing unit
200: Sound processing unit

What is claimed is:

1. A sound processing system, comprising:

a function acquisition unit for acquiring at least one interaural cross correlation function when listening to sound output from a plurality of speakers at a predetermined listening position;

a position determination unit for determining a target position based on a predetermined range of the at least one interaural cross correlation function acquired by the function acquisition unit;

a delay amount calculation unit for calculating a delay amount based on the target position determined by the position determination unit; and a delay unit for delaying an audio signal, which is a signal of the sound, output to at least one of the plurality of speakers, based on the delay amount calculated by the delay amount calculation unit; wherein the predetermined range is a range of ±n (milliseconds, where n is a positive value greater than 1.

2. The sound processing system according to claim 1, further comprising:

an acoustic center calculation unit for calculating an acoustic center of the predetermined range of the at least one interaural cross correlation function, on a coordinate plane with a correlation value on a vertical axis and time on a horizontal axis, wherein the position determination unit determines the target position based on the acoustic center of the predetermined range of the at least one interaural cross correlation function calculated by the acoustic center calculation unit.

3. The sound processing system according to claim 2, wherein the target position is the acoustic center of the predetermined range of the at least one interaural cross correlation function or a peak position of the interaural cross correlation function near the acoustic center.

4. The sound processing system according to claim 2, wherein when a sign of a correlation value serving as a peak position of the interaural cross correlation function after delay processing of the audio signal by the delay unit is negative, a phase of the audio signal is corrected such that the sign of the correlation value is positive.

5. The sound processing system according to claim 1 wherein the function acquisition unit acquires the interaural cross correlation function corresponding to each of a plurality of bandwidths, and for each of the plurality of bandwidths, the target position is determined by the position determination unit, the delay amount is calculated by the delay amount calculation unit, and delay processing is performed on the audio signal by the delay unit.

6. A sound processing method, wherein a computer is caused to perform the following processing:

acquiring at least one interaural cross-correlation function when listening to sound output from a plurality of speakers at a predetermined listening position;

determining a target position based on a predetermined range of the at least one acquired interaural cross-correlation function;

calculating a delay amount based on the determined target position; and delaying an audio signal, which is a signal of the sound, output to at least one of the plurality of speakers, based on the calculated delay amount, wherein the predetermined range is a range of ±n milliseconds, where n is a positive value greater than 1.

* * * * *